C. FIEDLER.
ANIMAL TRAP.
APPLICATION FILED AUG. 20, 1909.
1,015,794.
Patented Jan. 30, 1912.
2 SHEETS—SHEET 1.
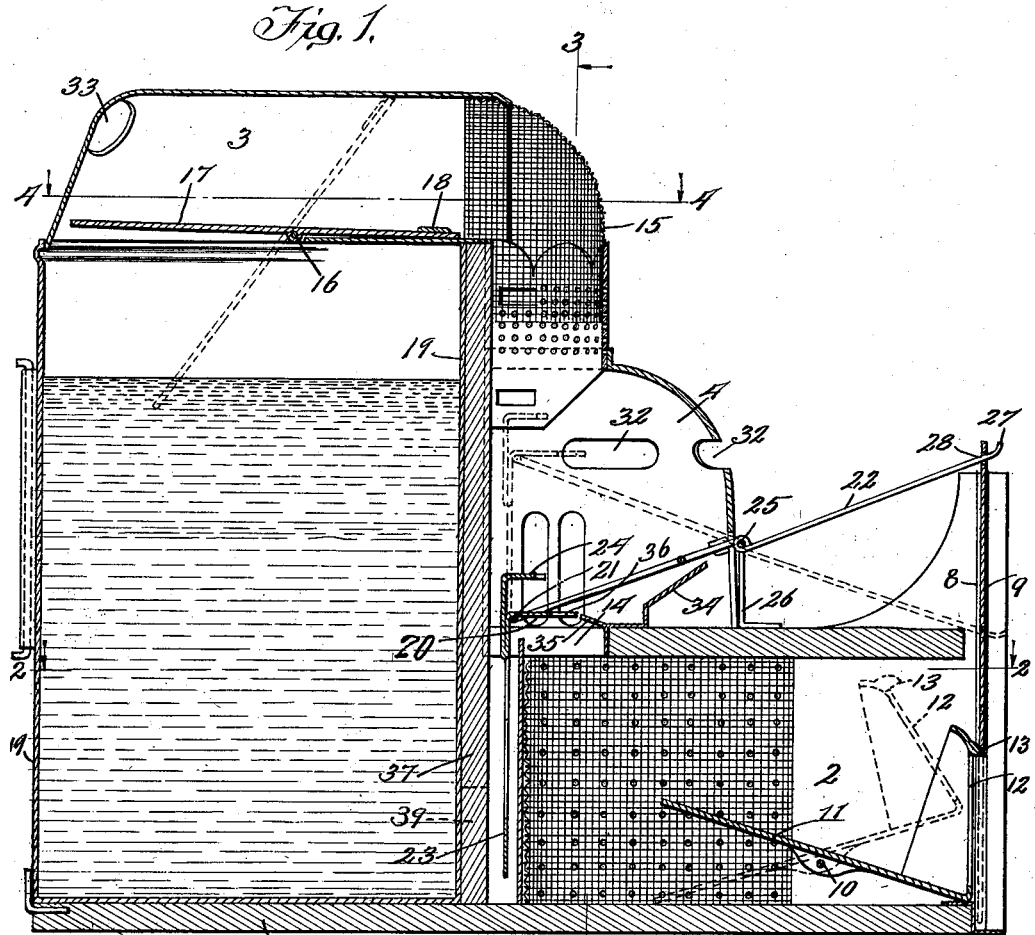
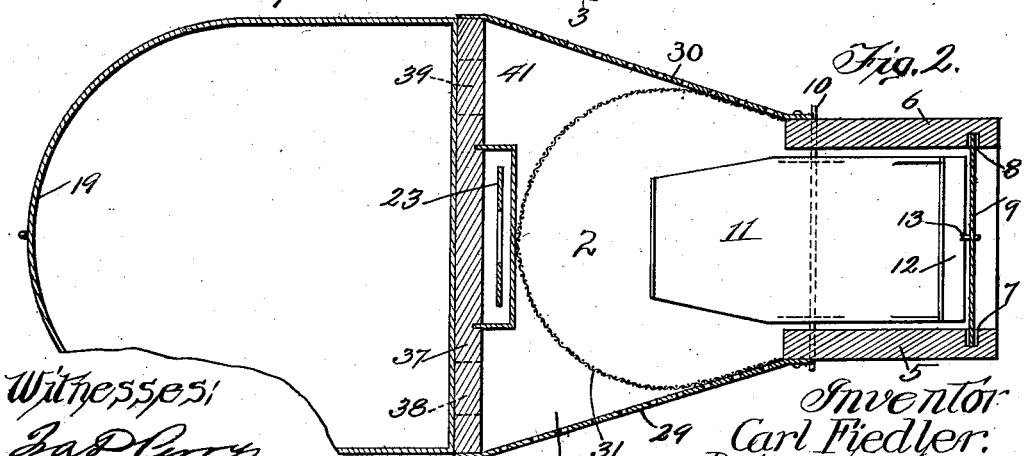
Witnesses:
Inventor
Carl Fiedler C. FIEDLER.
ANIMAL TRAP.
APPLICATION FILED AUG. 20, 1909.
1,015,794.
Patented Jan. 30, 1912.
2 SHEETS—SHEET 2.
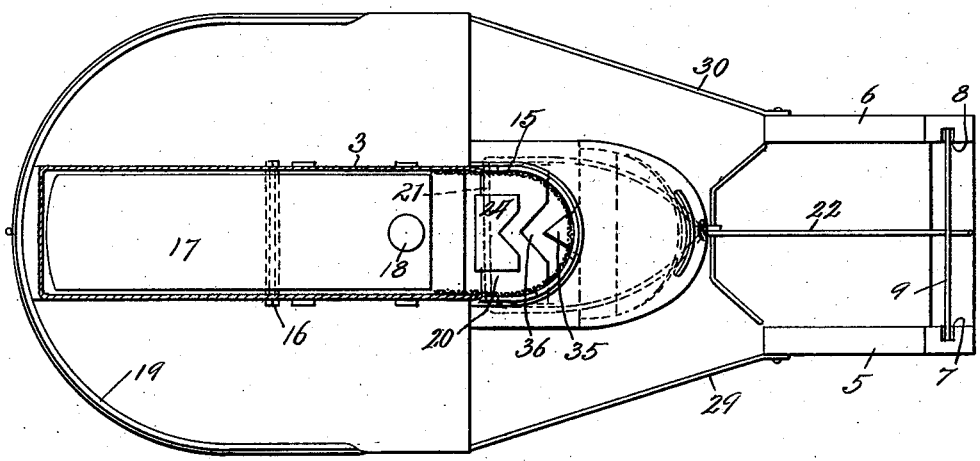
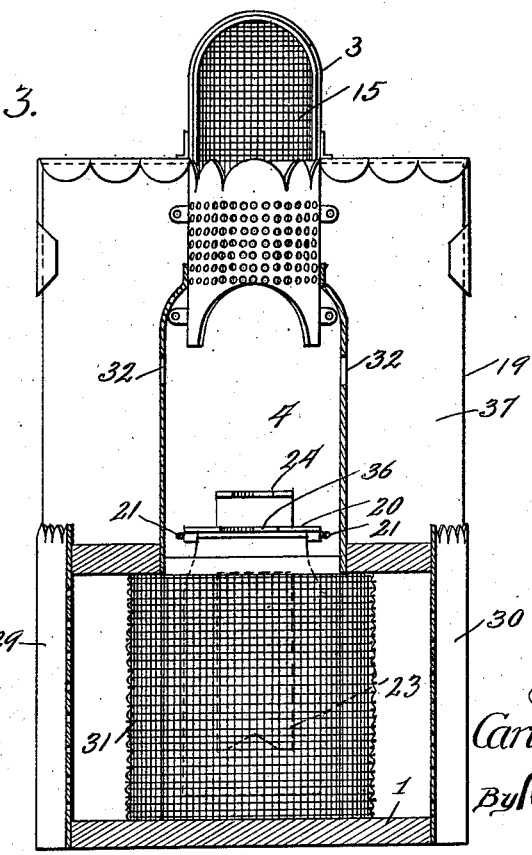

UNITED STATES PATENT OFFICE.

CARL FIEDLER, OF CHICAGO, ILLINOIS.

ANIMAL-TRAP.

1,015,794. Specification of Letters Patent. Patented Jan. 30, 1912.

Application filed August 20, 1909. Serial No. 513,744.

*To all whom it may concern:*

Be it known that I, CARL FIEDLER, a citizen of the United States, residing at Chicago, in the county of Cook and State of Illinois, have invented certain new and useful Improvements in Animal-Traps, of which the following is a specification.

My invention relates to that class of animal traps which, after each operation of a trap-door, is automatically set by the movement of the animal within the trap.

The main object of this invention is to provide improved means for automatically setting the trap.

Another object is to provide an improved construction, combination and arrangement of parts by means of which the trap is automatically set.

Other and further objects will appear in the specification and be more specifically pointed out in the claims in connection with the drawings showing an exemplification of my invention.

In the drawings—Figure 1 is a vertical longitudinal section of a trap provided with my improvements. Fig. 2 is a cross section on the line 2—2 of Fig. 1. Fig. 3 is a vertical section on the line 3—3 of Fig. 1. Fig. 4 is a section on the line 4—4 of Fig. 1.

Referring more particularly to the drawings, and to the exemplification of my invention shown therein, the base member 1 of any suitable form has mounted thereon a superstructure providing a plurality of chambers arranged in series and provided with intercommunicating passages, said chambers as preferably arranged consisting of an entry chamber 2, another chamber 3 arranged above and rearwardly of said entry-chamber, and an intermediate chamber 4 which is substantially an enlargement in the vertical gallery or passageway connecting chambers 2 and 3. Said entry chamber 2 is provided with standards 5, 6 having guideways 7, 8, within which is slidably mounted a trap-door 9 adapted to be moved into and out of closing position in said guide-ways. Adjacent to said trap-door and pivotally mounted within the entry chamber 2, preferably by means of a pintle 10, is a tilting platform 11 having upon the forward end thereof a frame or shield 12, which in the normal open position of the trap, is disposed contiguous to the sliding plane of the trap-door 9. Adjacent the upper edge of said frame 12 is a wedge shaped lug 13, which, during the tilting movement of the platform 11, is thrown into and out of the path of movement of the trap-door 9, said platform being thereby adapted when in the position shown in full lines in Fig. 1 to hold the trap-door in open position and to permit the said trap-door to descend when thrown by the weight of the animal into the position shown in dotted lines. The adjacently disposed chambers 2 and 4 communicate with each other by means of a passage 14, while the chambers 4 and 3 are provided with a communicating passage 15 in the form of a neck or ninety degree bend, to be hereinafter referred to. Swinging about a horizontal axis 16 within the chamber 3 is a tilting platform 17 having rigidly secured at one end a weight 18 for maintaining it in a substantially horizontal position until the rear end thereof is subjected to the weight of the animal, at which time the platform swings upon its axis to dump the animal downwardly into the can or receptacle 19, which is preferably partly filled with water.

Disposed within the vertical passageway leading from the chamber 2 is a reciprocable support or platform 20 surmounted by a step 24 and pivotally mounted upon one end 21 of an oscillatory lever 22. The platform 20 is preferably provided with a depending stem or shank 23 suitably housed in the rear end of the entrance chamber 2 and adapted to maintain the platform 20 substantially horizontal during the reciprocating movement. The lever 22 is pivotally supported intermediately of its ends on a pivot 25 mounted in a standard 26, which standard is preferably secured to the top of the chamber 2. The forwardly extending end of the lever 22 is curved at 27, and pivotally engages in a hole 28 in the upper end of the slidably mounted door 9, so that said door 9 is raised and lowered when the lever 22 is oscillated about its pivot. The comparative lengths of the arms of said lever 22 and the weights of the reciprocating trap-door 9 and platform 20 respectively are so proportioned as to permit the trap-door 9 to descend under the action of its own weight, thereby simultaneously lifting the platform 20 into its upper position. The step 24 provides a platform elevated above the floor of the chamber 4 when the platform 20 is in its lowermost position.

Referring now to Fig. 2 of the drawings, the lateral walls of the chamber 2 comprise the inclined portions 29, 30, which are preferably provided with small perforations to permit the passage of air therethrough. Extending across between the lateral walls 29, 30 is a partition 31, preferably of wire netting, said partition being disposed in substantially semi-circular form in such manner as to bring the animal immediately below the passage 14 as it proceeds back into the chamber 2.

In order to provide means for luring the animal upwardly and rearwardly through the trap, the chamber 4 is provided with a plurality of slotted openings 32, which by the admission of light attract the animal's attention and cause it to climb into the chamber 4. For a similar purpose the elbow 15 connecting the chambers 4 and 3 is preferably made of some reticulated structure for the admission of light, while in the rearmost end of the gallery 3 are provided perforations 33 for a similar purpose. Mounted within the chamber 4 and adjacent to the passage 14 is a foot rest 34, by means of which the movement of the animal is facilitated through the vertically disposed portion of the runway. Said foot rest is provided with a projecting lug 35, which as shown in Fig. 4, is oppositely disposed to a recess 36 in the platform 20, so that when the animal after having reached the chamber 4 and applied its weight to the platform 20, said platform is caused to descend and to bar the passage 14 to prevent the animal's return. During said movement of the platform 20, the lever 22 is oscillated on its axis to lift the trap-door 9 into open position, whereupon, the tilting platform 11 swings downwardly into locking position to maintain said trap-door 9 in its raised position. The animal now having passed upwardly through the run-way under the lure of the light admitted through the elbow 15, reaches the rearwardly extending gallery 3 upon which, seeking an escape in the direction of the perforations 33, it advances out on to the unsupported end of the dumping platform 17 to be automatically deposited within the receptacle 19.

As a preferred embodiment of my invention, the receptacle 19 is provided of suitable shape to abut against a vertically projecting standard or support 37, said standard also serving as a rigid means for mounting the vertically and rearwardly extending runway. Adjacent the lower end of said standard 37 are provided two holes 38, 39, through which, when said receptacle is displaced, any suitable bait may be introduced into the recesses 40, 41, between the standard 37 and the circular partition 31.

What I claim is:

1. In an animal trap, the combination of an entrance chamber, an inner chamber spaced therefrom and at a higher elevation, a passageway connecting said chambers, a platform reciprocably mounted in said passageway, a trap door for the entrance chamber and a lever pivoted intermediately of its ends and having its ends operably engaging said platform and trap door respectively.

2. In an animal trap, the combination of an entrance chamber, an inner chamber spaced therefrom and at a higher elevation, a passageway connecting said chambers, a platform reciprocably mounted in said passageway, a trap door for the entrance chamber and a lever pivoted intermediately of its ends and having its ends operably engaging said platform and trap door respectively, said platform being provided with means which closes the opening from said entrance chamber into said passageway when the trap door is opened.

3. In an animal trap, the combination of an entrance chamber, a second chamber elevated above the entrance chamber and spaced therefrom, a passageway extending from the entrance chamber to said second chamber, a support reciprocably mounted in said passageway and provided with a platform projecting therefrom across said passageway, said passageway being enlarged intermediately of said chambers, a trap door for said entrance chamber, and a lever pivoted intermediately of its ends and having its ends engaging the trap door and support respectively.

4. In an animal trap, the combination with two chambers with a communicating opening, one of said chambers being provided with a door-way in the outer wall thereof, of a trap-door slidably mounted in said door-way, an oscillating platform normally engaging said trap-door to hold it in open position, a lever pivoted intermediately of its ends, said lever pivotally engaging at one end with said trap-door, and a platform pivotally mounted on the other end of said lever, said platform being thereby adapted to be moved into and out of closing position with reference to said communicating opening.

5. In an animal trap, the combination of an entrance chamber, a second chamber elevated above the entrance chamber and spaced therefrom, a passageway extending from the entrance chamber to said second chamber, a support reciprocably mounted in said passageway and provided with a platform projecting therefrom across said passageway, said passageway being enlarged intermediately of said chambers, a trap door for said entrance chamber, and a lever pivoted intermediately of its ends and having its ends engaging the trap door and support respectively, said platform being moved into position to close the opening from the entrance chamber to said passageway when the support is lowered.

In testimony whereof I have signed my name to this specification, in the presence of two subscribing witnesses, on this 17th day of August A. D. 1909.

CARL FIEDLER.

Witnesses:
M. W. CANTWELL,
A. O. KNIGHT.